July 8, 1969 D. CRENSHAW 3,454,693
PROCESS FOR FORMING PLASTIC OBJECTS
Filed Oct. 23, 1963 Sheet 1 of 8

INVENTOR
DAVID CRENSHAW,
BY HIS SOLE HEIR
HELEN M. CRENSHAW
BY
*Lyon & Lyon*
ATTORNEYS July 8, 1969     D. CRENSHAW     3,454,693

PROCESS FOR FORMING PLASTIC OBJECTS

Filed Oct. 23, 1963

INVENTOR
DAVID CRENSHAW,
BY HIS SOLE HEIR
HELEN M. CRENSHAW

BY *Lyon & Lyon*
ATTORNEYS

INVENTOR
DAVID CRENSHAW,
BY HIS SOLE HEIR
HELEN M. CRENSHAW
ATTORNEYS

3,454,693
PROCESS FOR FORMING PLASTIC OBJECTS

David Crenshaw, deceased, late of Monrovia, Calif., by Helene M. Crenshaw, sole heir, Ewa, Hawaii, assignor, by mesne assignments, to Jaylis Industries, Inc., Los Angeles, Calif., a corporation of California
Filed Oct. 23, 1963, Ser. No. 319,092
Int. Cl. B29f 3/00; B29c 24/00
U.S. Cl. 264—151    3 Claims This invention relates to a process for producing plastic objects and more particularly relates to a process for postforming a continuous stream of formed plastic material.

At the present time, simple plastic objects are formed either by extrusion or by one of a variety of molding techniques. The process of extrusion is a continuous one, and thus well suited to the rapid and inexpensive production of plastic articles, but by the nature of an extruder, articles formed by this process are necessarily simple, with variations in contour generally restricted to planes parallel to the direction of the extrusion. The various molding techniques, on the other hand, are capable of forming almost any object, no matter how complex, but are limited in the speed at which objects can be formed by their non-continuous or intermittent nature.

In general, the various molding processes require that the mold be used for receiving the material to be molded, forming the material, generally in a molten condition, in the desired pattern, and then holding the formed material for a cooling time sufficient to insure that the material will not droop or deform upon release from the mold. After the mold is removed, it usually must be transported to a deflashing station, and possibly to other finishing stations. During the time that the mold is employed in performing its three operations, or at least portions thereof, the remainder of the equipment, such as the plastic supply apparatus and the deflasher, is idle and thus not being used to its full capacity. The rate at which articles can be formed is thus reduced, and inasmuch as this rate is one of the determining cost factors, the cost of the articles is increased.

According to the present invention, a process is provided for continuously forming plastic objects having contour variations in any desired direction. The apparatus used operates at near its full capacity, thus increasing the rate at which objects are produced and correspondingly reducing their cost. The invention utilizes a continuous stream of preformed plastic material and then reforms the material by means of suitable dies. The plastic material is preferably preformed by an extruder which provides the material with the basic longitudinal contours needed. The extrudate is then passed to suitable dies which may be designed to perform any number of operations such as deforming, shearing, piercing, cutting, embossing, coining, etc., to modify the preformed plastic and provide it with lateral contours.

By first extruding the plastic material and then stamping or pressing it to its final desired form, the various pieces of equipment can operate near their full capacity. The extruder produces a continuous stream of formed material ready to be worked on, and thus the dies do not have to serve as material receptacles but can close right on the material at a proper moment in their operating cycle. Moreover, since the material is at a relatively low temperature, the cooling time period during which the dies must carry the material is relatively short.

It is therefore an object of the present invention to provide a continuous process for forming plastic objects.

It is another object of the present invention to provide such a process in which a preformed stream of plastic material is reformed and separated into individual objects.

It is a further object of the present invention to provide such a process in which a plastic stream is preformed by an extruder and then reformed by stamping or pressing or other die-forming operations.

It is still a further object of the present invention to provide such a process in which a portion of an extruded stream of material is simultaneously deformed and cut.

These and other objects and advantages of the present invention will become more apparent upon reference to the accompanying description and drawings in which.

Figure 1:
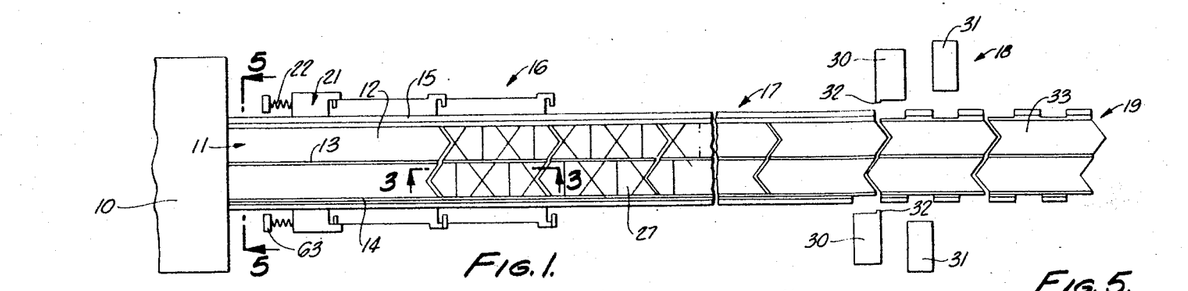
FIGURE 1 is a top plan view of a schematic representation of the process and apparatus of the present invention.
Figures 2, 3, 4, 5:
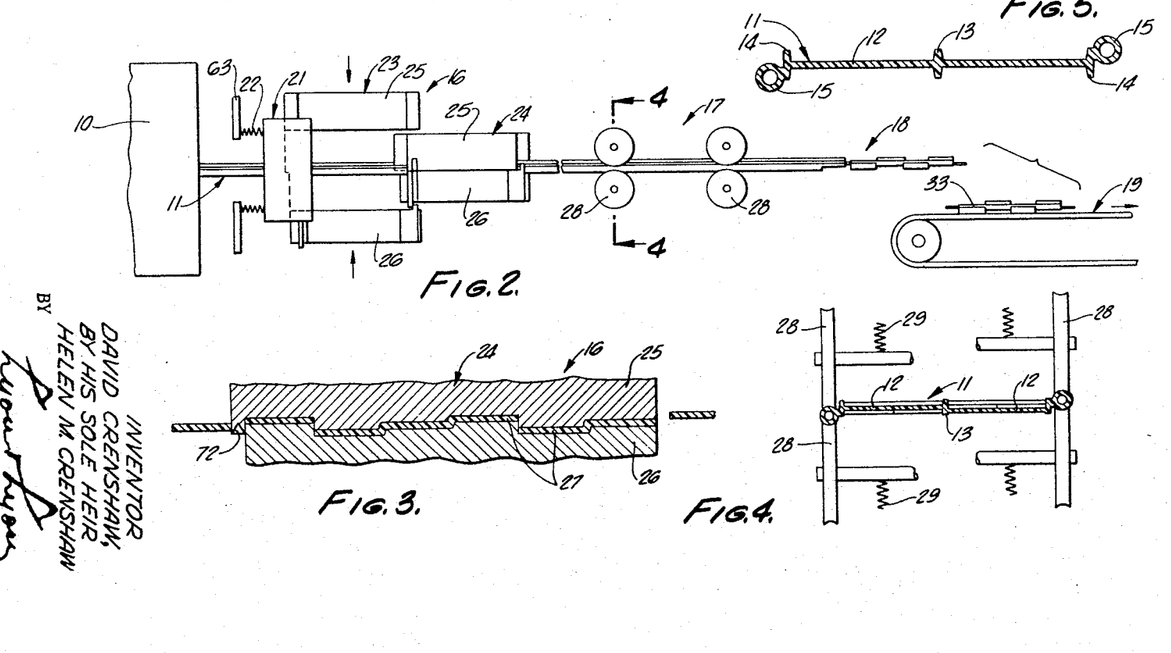
FIGURE 2 is a side elevation of the schematic representation of FIGURE 1.
FIGURE 3 is a sectional view of one of the dies of the present invention taken along line 3—3 of FIGURE 1.
FIGURE 4 is a view, partly in section, taken along line 4—4 of FIGURE 2.
FIGURE 5 is a sectional view taken along line 5—5 of FIGURE 1 showing the configuration of one type extrudate used in the present invention.

Referring now to FIGURES 1 through 6, a preferred embodiment of the plastic object forming process and apparatus of the present invention is illustrated. An extruder 10 of any conventional type extrudes an extrudate 11, the cross section of which is shown in FIGURE 5. From this figure, it can be seen that the extrudate 11 has a web portion 12, a central ridge 13, end strips 14 and tubular side members 15. It can be seen that the positions of attachment of the tubular side members 15 to the end strips 14 are inverted on either side of the extrudate 11.

The extrudate 11 is passed through a forming and cutting stage 16, a cooling stage 17, and a cutting stage 18, the cutting stage 18 being followed by a conveyor 19 for conveying away the finished objects.

The apparatus of the cutting stage 16 includes a sizing and backup die 21 which is spring biased by springs 22 towards a pair of forming and cutting dies 23 and 24 which are adapted to cooperate with each other to both form and cut the extrudate in a desired pattern. For this purpose, each of the forming and cutting dies 23 and 24 are provided with an upper member 25 and a lower member 26. As can be seen from FIGURE 1, the operation of the dies 23 and 24 divide the extrudate 11 into a plurality of formed panel sections 27, the web portions and central ridges of which are separated from each other but the end strips 14 and tubular side members 15 of which are still continuous.

The plastic material now passes through the cooling stage which may simply consist of moving the material through the ambient air by means of a number of rollers 28 having a concave periphery which holds the tubular side members 15. The rollers 28 are biased into contact with the tubular side members 15 by springs 29 which insure that the pressure exerted by the rollers 28 will not be sufficient to collapse the tubular side members.

The extrudate 11 now passes to the cutting stage 18 where it is simultaneously cut by a first pair of cutting knives 30 and a second pair of cutting knives 31. The cutting knives 30 are provided with extending blades 32 which protrude sufficiently to sever the end strips 14. The remainder of the cutter knife 30 and the cutter knife 31 cut only the tubular side members 15 with the result that individual panels 33 are formed.

Figure 6:
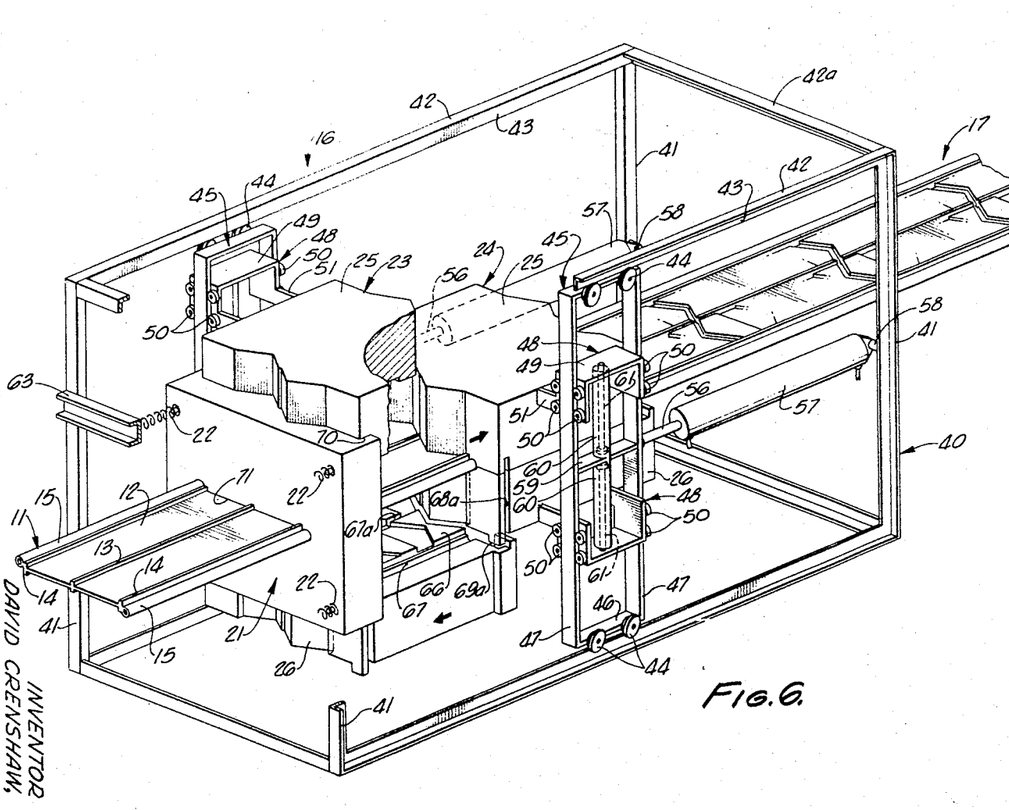
FIGURE 6 is a perspective view of apparatus suitable for use in the present invention.

Referring now to FIGURE 6, there is shown suitable apparatus for manipulating the various dies used in the process of the present invention. A supporting framework 40 is provided with L-shaped horizontal members 42 joined by cross braces 42a, the upstanding legs of the horizontal members 42 serving as tracks 43 on which ride the wheels 44 of horizontally travelling carriages 45. The wheels 44 are mounted for rotation on either end of a generally rectangular framework 46, the vertical struts 47 of which serve as tracks for vertically travelling carriages 48.

Each of the vertically travelling carriages 48 is provided with a body portion 49 which mounts two pairs of wheels 50 at each end thereof, the pairs bracketing the vertical struts 47. The carriages 48 are also provided with extending arms 51 which are welded or otherwise suitably fastened to the upper and lower members 25 and 26 of the blanking and forming dies 23 and 24.

The piston rods 56 of power cylinders 57 are attached to the vertical strut 47 of the near carriages 45 while the other end of the power cylinder 57 is mounted on one of the vertical members 41 by means of a pivot pin 58. The power cylinder 57 may be hydraulic or pneumatic and serves to reciprocate the forming and cutting die 24 in a horizontal direction. The framework 46 is provided with a cross bar 59 on which are mounted a pair of power cylinders 60 having piston rods 61 attached to the carriages 48. The power cylinders 60 may also be either hydraulic or pneumatic and serve to reciprocate the upper and lower members 25 and 26 of the forming and cutting die 24 in a vertical direction.

Similar structure is provided for driving the forming and cutting die 23, this structure being located on the opposite or far side of the framework 40. The sizing and backup die 21 is mounted for horizontal movement on suitable supporting tracks (not shown) and is constantly urged to the right by the springs 22 which are seated on suitable cross braces 63.

As can be seen from FIGURE 6, the lower members 26 of the forming and cutting dies 23 and 24 are provided with a die plate 66 arranged in a desired pattern and flanked by grooves 67 which are of a suitable configuration to grasp the undersides of the end strips 14 and tubular side members 15. A central groove 67a is provided for grasping the central ridge 13. The upper members 25 are provided with matching die plates and grooves for cooperation with the lower members.

The lower members 26 are further provided with a leading contact lip 69 and a trailing contact lip 68 and alignment guide slots 69a and 68a which cooperate to hold the dies 23 and 24 together during a portion of the operating cycle. The sizing and backup die is provided with guide lips 70 for cooperating with the forming and cutting dies 23 and 24 and is also provided with an aperture 71 through which the extrudate 11 passes. Each of the upper members 25 of the forming and cutting dies 23 and 24 is provided with a severing edge 72 for dividing the web portion into the separate sections 27 when the die closes, as shown in FIGURE 3.

Figure 8:
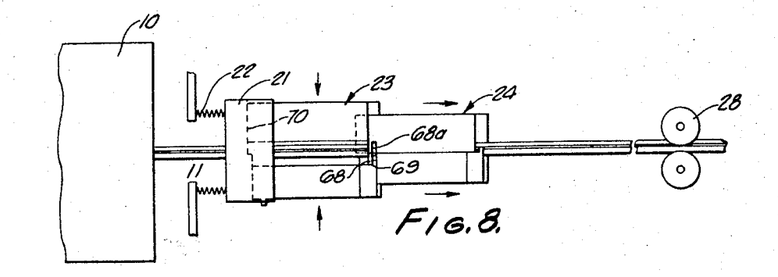
FIGURES 8, 9, 10 and 11 illustrate the various stages in the process of the present invention.
Figure 9:
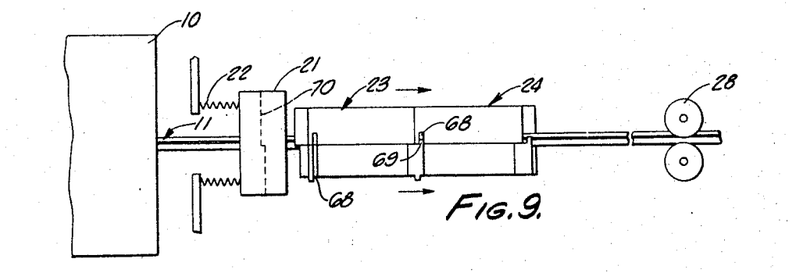
Figure 10:
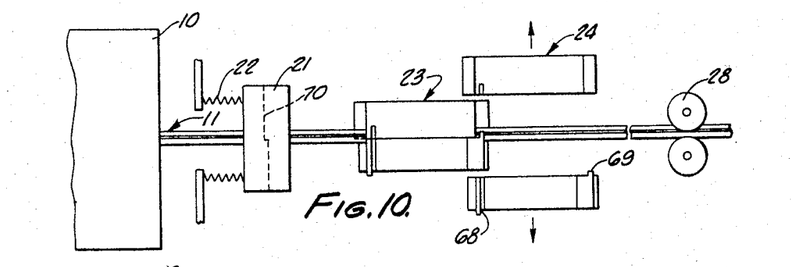
Figure 11:
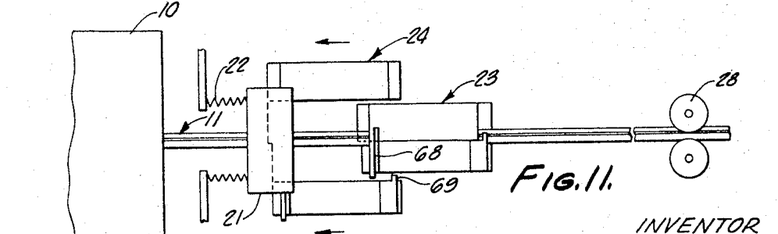

Turning now to FIGURES 8, 9, 10 and 11, there are shown the various stages of the forming cycle. In FIGURE 8, the die 24 is shown as closed over a section of the extrudate 11 while the die 23 is shown as about to close over the succeeding portion of the extrudate 11. In this position, the die 23 is in engagement with the sizing and backup die 21 and is maintained in alignment therewith by the guide lips 70. The die 23 is maintained in alignment with the die 24 by means of the alignment guide slots 68a and 69a in each of the dies. As the piston rods 61 are retracted into the power cylinder 60, the upper and lower members 25 and 26 of the die 23 close on the extrudate 11 and perform their combined forming and cutting operations.

In order for the pattern to be properly formed and to prevent the slumping of the various parts of the pattern, it is necessary that the die travel along with the panel section until it has had sufficient time to set properly. The two forming and cutting dies 23 and 24 and the sizing and backup die 21 travel along together under the action of the power cylinders 57 until the springs 22 are fully extended. The dies 23 and 24 then leave the sizing and backup die 21.

The forming and cutting dies 23 and 24 continue to move to the right for a predetermined length of time and then the power cylinders 60 associated with the upper and lower members 25 and 26 of the die 24 are actuated, causing the upper and lower members to separate, the dies 23 and 24 still traveling together until the alignment guide slots are disengaged. The carriage 45 associated with the die 24 is then caused to move to the left by the power cylinders 57, the upper and lower members 25 and 26 of the die 24 thereby crossing over and under respectively the die 23. The returning die, 24 in this case, travels at a much faster speed than the die 23 and engages the sizing and backup die 21. It continues to move to the left, thereby compressing springs 22. The power cylinder is then deactivated and the die 24 is momentarily motionless, all of this occurring before the trailing end of the die 23 has moved beyond the leading end of the now returned die 24.

Soon thereafter, the trailing contact lip 68 of the lower member 26 of the die 24 engages the leading contact lip 69 of the lower member 26 of the die 23. In response to this engagement, the cylinders 60 are activated to retract the pistons 61 and the upper and lower members 25 and 26 of the die 24 move towards each other, the die being kept in proper alignment by the guide lips 70 and the alignment guide slots 68a and 69a. The two members of the die 24 then engage the extrudate 11 to form another panel and the cycle is repeated. Any conventional electric or pneumatic control system known to those skilled in the art could be used for controlling the operation of the various power cylinders and such a control system forms no part of the present invention.

The formed panels 27 are then carried to the cutting station 18 where the cutting knives remove the unwanted portions of the cylindrical side member 15 and sever the end strips 14 to separate the stream into individual panels 33.

As a first example of the previously described process, polyvinyl chloride may be extruded at approximately 380 degrees Fahrenheit and cooled before being passed to the sizing and backup die 21, the temperature of the material as the dies close being between 225–275 degrees Fahrenheit. The temperature at this point must fall within a range such that a skin of relatively cool material is formed on the outside of the extruded material which is thick enough to allow contact by the dies without sticking or complete deformation, yet is thin enough to allow displacement and shearing of the material without cracking or breaking. This cooled skin also serves to prevent the extrudate from sagging when it is temporarily left unsupported by the movement of the dies 23 and 24 away from the sizing and backup die 21. The temperature range stated above is satisfactory to assure that a sufficient skin has been formed.

The power cylinders 60 are such that the pressure exerted by the die members 25 and 26 considerably exceeds any probable necessary working pressure for any of the plastics commonly used. After the dies have closed and formed the panel section, the dies remain closed over the section until the polyvinyl chloride has cooled to below 130° F., at which temperature the material has set sufficiently to insure that it will not sag or otherwise deform when the die is removed.

The speed at which the die travels is then more or less determined by the cooling time necessary, as the distance the die can travel is limited to the length of the die itself, as explained previously. Of course, if the apparatus is modified so that more than two dies are used, the travel distance is correspondingly increased. If desired, a coolant, for example cold water, can be supplied to the interior of the dies so that the cooling effect is increased, thereby also increasing the permissible travel speed of the die.

As a second example of the process, the extruded material may be polystyrene. The permissible temperature range of this material at the forming station falls between 250° F. and 300° F. and the temperature at which the formed panel sections may be released by the dies is 150° F. and below. The extrusion temperature of polystyrene is about 380° F.

As a third example of the process, polyethylene, which has an extruding temperature of about 400° F. may be fed to the forming and cutting dies at a temperature within the range of 200° F. to 250° F. The formed panel sections may be released by the dies when they cool to about 100° F.

In the particular process illustrated in FIGURES 1–11, the die plates 66 of the dies 23 and 24 were formed to simultaneously deform and sever the material between them. The particular deformation consisted of offsetting areas of the web portion 12 of the extrudate 11 into two planes other than the original plane, one plane being above the original and the other below. As shown best in FIGURE 7, the offset areas are shield shaped, areas 74 being displaced or offset into a plane above the original plane, and areas 75 being displaced or offset below the original plane. The areas 75 are also shield shaped, but have their apexes pointing in a direction opposite to the apexes of the areas 74. Offsetting of these areas leaves bow tie-shaped areas 76 still disposed in the original plane. As can be seen, the three planes of material are contiguous in the areas where an area 76 is between areas 74 and 75, but separated where areas 74 and 75 meet, leaving vertical slots 77 in the material. The material has thus been simultaneously deformed and severed to form the finished panel.

Figure 7:
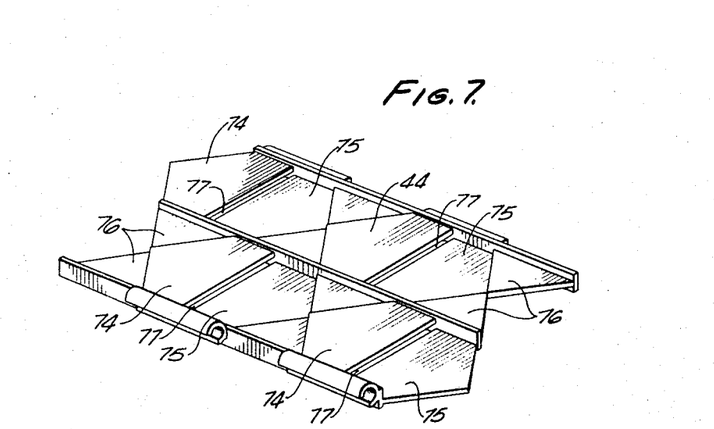
FIGURE 7 is a perspective view of a panel formed according to the present invention.

Panels of the type shown in FIGURE 7 are useful in the construction of foldable traverse screens such as described in U.S. Patent No. 2,976,923, issued Mar. 28, 1961, to James Hirashiki. The remaining sections of the cylindrical side members 15 serve as the hinge barrels through which supporting rods are inserted to construct the screen.

Referring now to FIGURES 12 through 18 there is shown a modified die which may be used in place of the die previously described. The die 84 has an upper die member 85 and a lower die member 86 which are mounted on the framework 40 of FIGURE 6 in the same manner as were the dies 23 and 24, that is, the entire die 84 is mounted on a horizontally traveling carriage while the upper and lower die members 85 and 86 are mounted on vertically traveling carriages. This die is suited for use with an extrudate generally similar to that shown in FIGURES 1–12, but having side members which are only partly cylindrical, having an opening or slot formed along their entire length.

Figure 12:
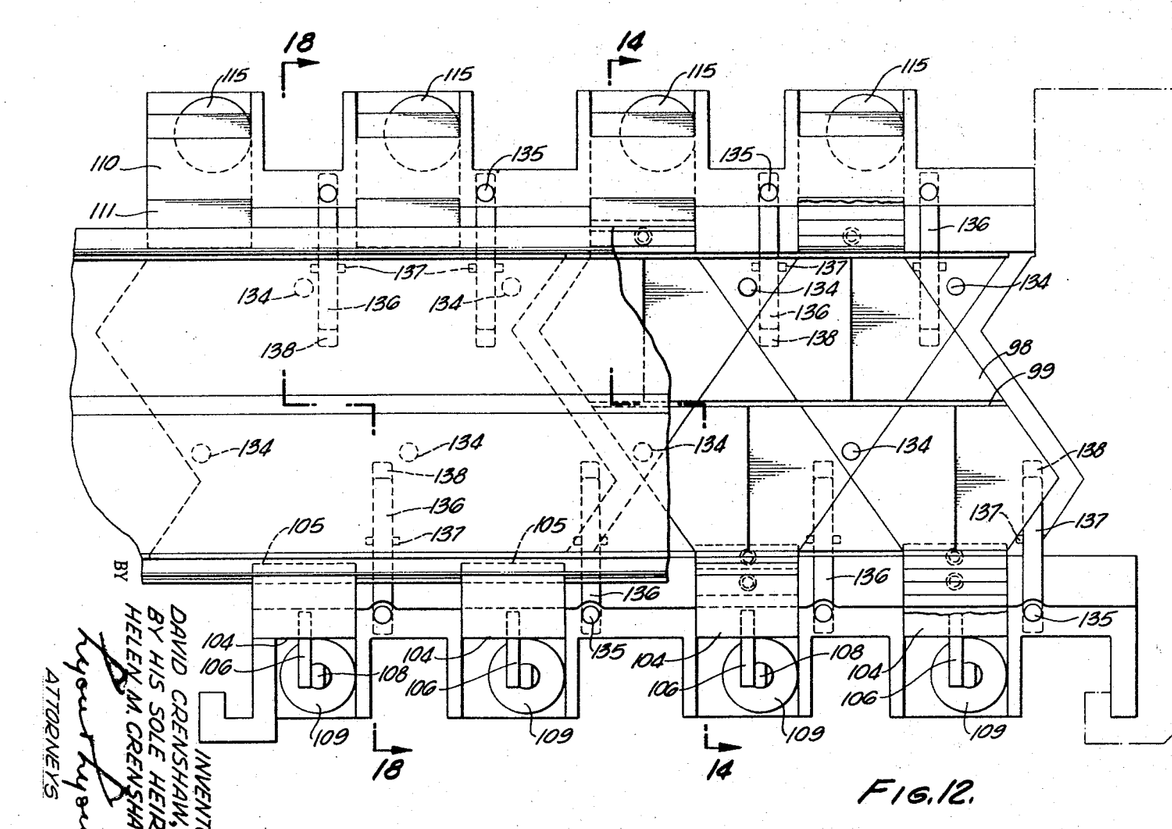
FIGURE 12 is a view, with the extrudate partly broken away, taken along line 12—12 of FIGURE 15 and showing the construction of a die that may be used in place of that shown in FIGURES 1 through 11.
Figure 13:
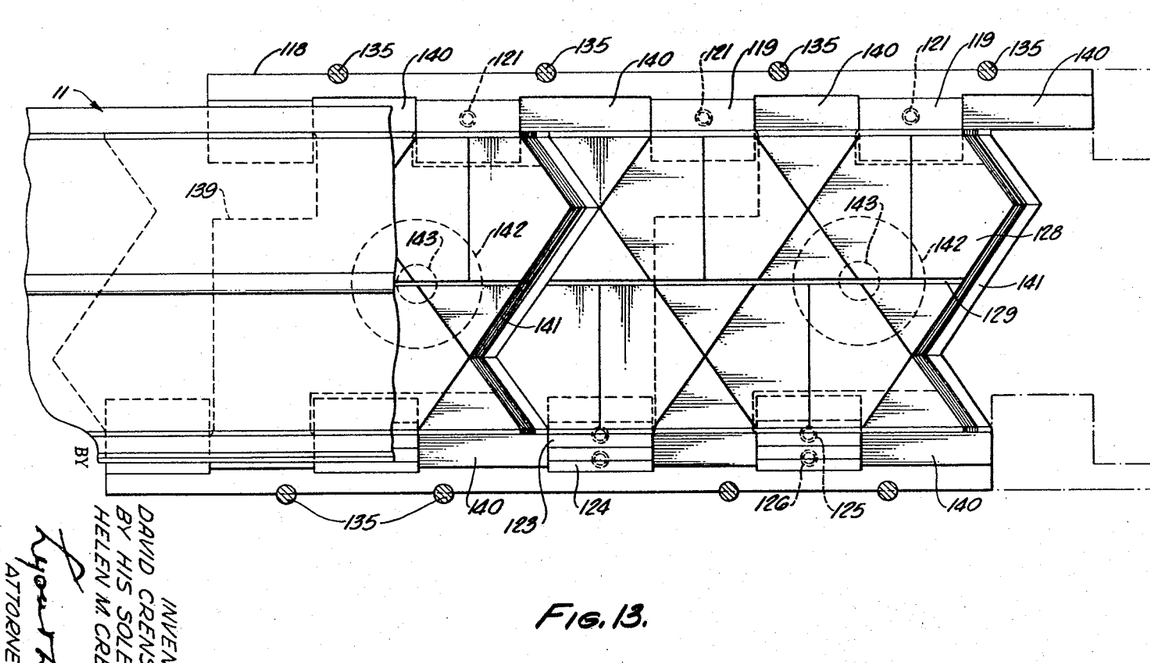
FIGURE 13 is a view, partly broken away, taken along line 13—13 of FIGURE 15.

The lower die member 86 includes an outer block 87, and an inner die section 88 slidably mounted in the outer block 87. A plurality of supporting die sections 89 are mounted in slots 90 in the inner die section 88 and each of them is urged upwardly by a spring 91. The working faces of the supporting die sections 89 are formed to engage and support selected areas of the lower rounded portions of the side members of the extrudate. The inner die section 88 is provided with a second series of slots 92 in which are slidably mounted backup die sections 93 and second supporting die sections 94. Both of these die sections are urged upwardly by springs 95 and 96 and have working faces formed to engage the lower rounded portion of the other side member of the extrudate.

Figure 14:
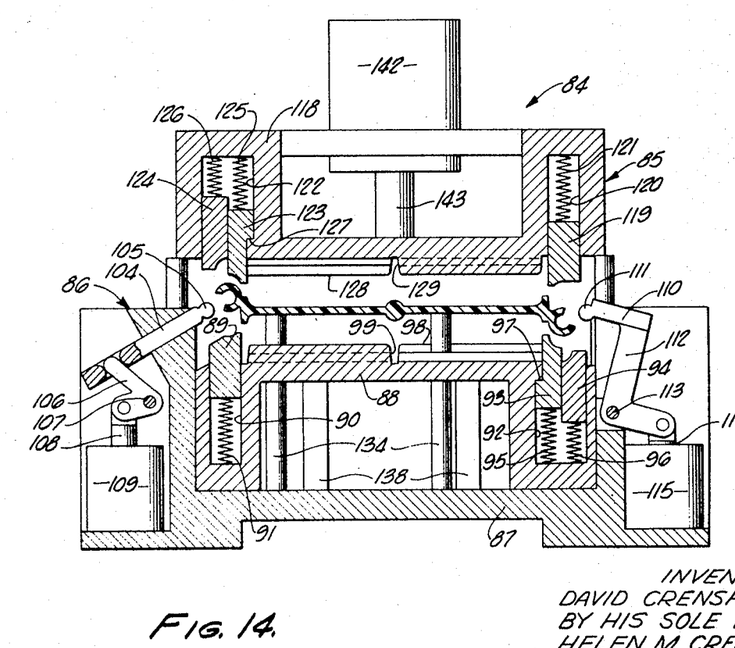
FIGURE 14 is a view, partly in section, taken along line 14—14 of FIGURE 12.
Figure 15:
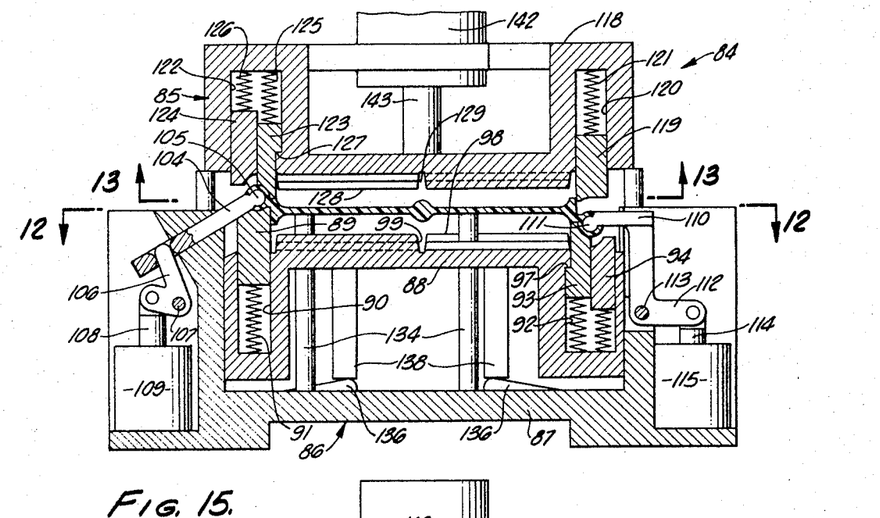
FIGURES 15, 16 and 17 are views similar to FIGURE 14 showing the positions of the various elements and the cycle of operation of the apparatus.

As can be seen from FIGURES 14 and 15, the backup die section 93 in the disengaged positon is higher than the supporting die section 94 so that the backup die section is the first section that engages the side member of the extrudate. The backup die section 93 is provided with a shoulder 97 which cooperates with a similar shoulder formed in the inner die section 88 to properly position the backup die section with respect to the inner die section. The working surface of the inner die section 88 is provided with a die face 98 whose contours determine the pattern of the objects formed from the extrudate. As shown, this die face includes a longitudinal recess 99 for forming the central head of the extrudate shown into a central ridge.

The lower die member 86 further includes a plurality of shape-maintaining die sections 104 which cooperate with the same areas of the extrudate cylindrical side members as do the supporting die sections 89. For this purpose, the die sections 104 are provided with elongated inserts 105 which are shaped such that they can be inserted into the slot formed in the cylindrical side member by forcing aside the walls of the side member, and then can maintain its proper shape and diameter. Each of the die sections 104 is mounted on one end of a bell crank lever 106 which is pivotally mounted on a pin 107. The other end of the lever 106 is pinned to the armature 108 of a solenoid 109, affixed in any suitable manner to the outer block 87. Actuation of the solenoid 109 will thus cause the insert 105 to be driven in a straight line fashion from the position shown in FIGURE 14 to the position shown in FIGURE 15.

On its other side, the lower die member 86 is provided with a second plurality of shape-maintaining die sections 110 having elongated inserts 111 on the outermost ends thereof. The inserts 111 are shaped like the inserts 105 and cooperate with the same areas of the side member on the other side of the extrudate as do the backup die sections 93 and supporting die sections 94. Each die section 110 is mounted on one end of a bell crank lever 112 which is pivotally mounted about a pin 113. The other end of the lever 112 is pivotally mounted to the armature 114 of a solenoid 115. Solenoids 115 act in the same manner as solenoids 109 and when actuated insert the inserts 111 into selected portions of the side member of the extrudate.

The upper die member 85 includes a main die section 118 and a plurality of supporting die sections 119 slidably mounted in a plurality of slots 120 in the die section 118 and urged downwardly by springs 121. The supporting die sections 119 have working faces formed to support the upper rounded portion of the side member of the extrudate in the same areas as the die sections 93 and 94 of the lower die member. The main die section 118 is provided with a second plurality of slots 122 in which are mounted backup die sections 123 and supporting die sections 124 which are similar in operation to the corresponding sections in the lower die member. These die sections are urged downwardly by springs 125 and 126, the position of the backup die section 123 being determined by a shoulder 127. The main die section 118 is provided with a die face 128 which cooperates with the die face 98 of the lower die member to form the extrudate in the desired manner, and also has a recess 129 for forming the central ridge.

FIGURES 14–18 show the manner in which the operation of the upper and lower die members 85 and 86 are inter-related. The lower die member is provided with a plurality of supporting rods 134 which are mounted on the outer block 87, extend through the inner die section 88, and project above this die section and the die sections 89, 93, and 94. These supporting rods 134 are the first members to engage the extrudate when the die closes and preferably engage the portions of the extrudate which are not displaced by the action of the die.

The lower die member 85 is also provided with a plurality of push rods 135 which are slidably mounted in suitable slots formed in the outer block 87. The lower end of each of the push rods 135 engages one end of a rocker arm 136 which is pivotally mounted on the outer block 87 by a pin 137. The other end of each of the rocker arms 136 engages a depending leg 138 of the inner die section 88. In the open position, the weight of the inner die section 88 causes the rocker arms 136 to pivot such that the upper ends of the push rods 135 extend substantially above the upper surface of the outer block 87. The push rods 135 are located in the block 87 so that they are at least partially engaged by the main die section 118 of the supper die member 85 when the die members close.

The upper die member 85 is further provided with side member severing and section separating dies 139 which are mounted above the die face 128 of the main die section 118. These dies 139 are provided with a plurality of shearing arms 140 and a section separating knife 141. The shearing arms 140 serve to shear off unwanted portions of the side members of the extrudate while the knife 141 serves to separate the extrudate into separate sections. Each die 139 is mounted to the die section 118 by means of a solenoid 142. The solenoid coil housing is fixedly supported by the die 139 while its armature 143 has its outer end welded or otherwise attached to the die section 118. When the solenoid is energized, the die 139 is drawn downward.

In operation, the die just described is mounted on the framework 40 together with another similar die in the same manner as were the dies 23 and 24 in FIGURE 6. The only manner in which this die operates differently from the dies in FIGURE 6 is in closing over the extrudate. When the die is in the proper position and the contact lips engage, the power cylinders 60 begin to retract piston rods 61 with the result that the vertically travelling carriages travel toward each other. When using the die 84, the cylinders 60 are adjusted so that the lower die member 85 will reach its final position sooner than the upper die section 86 and the support rods 134 will engage the lower surface of the extrudate, guarding it from any possible sagging. This position of the die members is shown in FIGURE 14.

As the upper die member 85 continues to close, its lower surface will engage the push rods 135 driving them down against the rocker arms 136 and consequently driving the inner die section 88 upwardly. As the inner die section 88 is forced to close, the backup die 93 will engage the side member on the right-hand side of the extrudate. At this same time, the upper die member has closed sufficiently so that the backup die 123 engages the other side member of the extrudate. FIGURE 15 shows the position of the elements at this point in the cycle.

Figure 16:
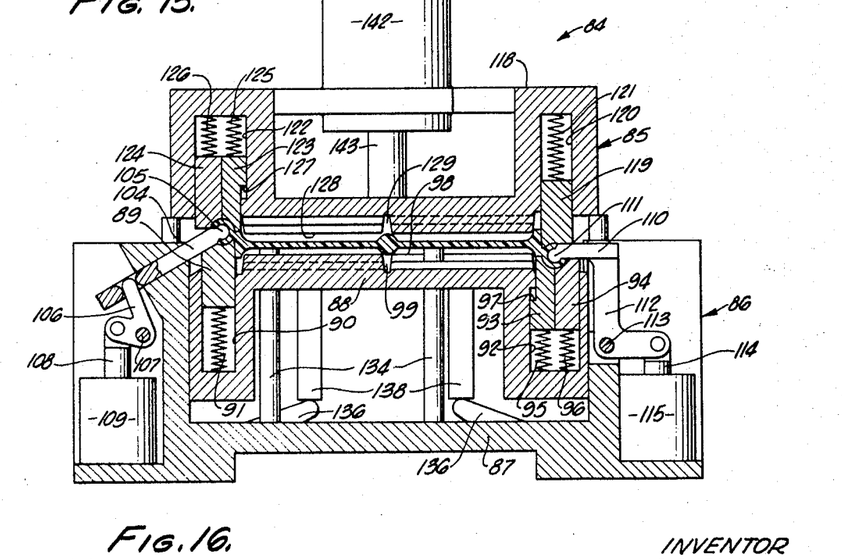

The solenoids 109 and 115 are now energized with the result that the inserts 105 and 111 are driven into the side members of the extrudate. The presence of the backup dies 93 and 123 prevents this engagement of the inserts from deforming the side members or the remainder of the extrudate. Continued closing of the upper die member next causes the supporting die sections 89, 94, 119 and 124 to engage the side members of the extrudate. All of these die sections cooperate to hold the side members in place and prevent them from being deformed or drawn when the web portion of the extrudate is deformed. This cooperation of the various die sections is shown in FIGURE 16.

Figure 17:
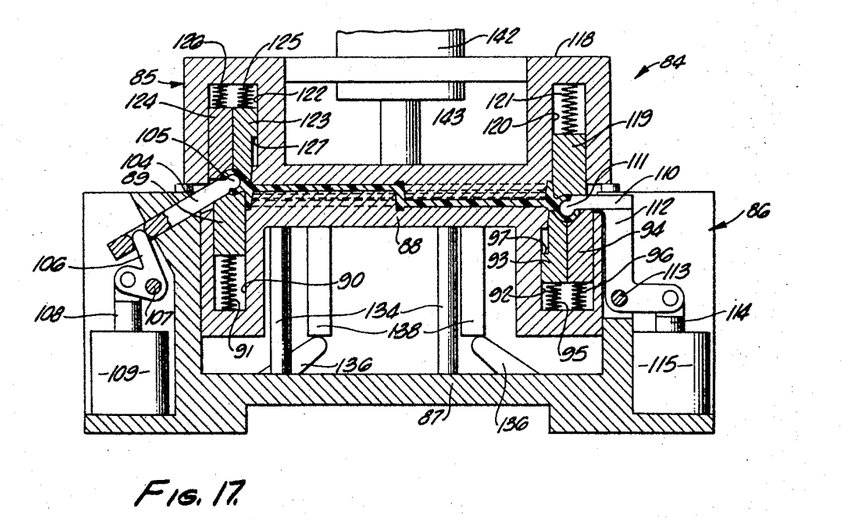
Figure 18:
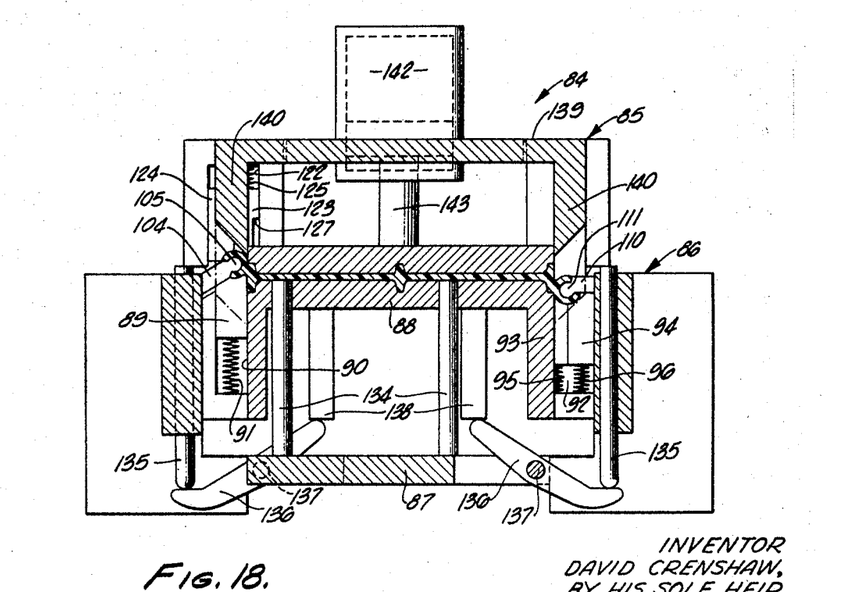
FIGURE 18 is a view, partly in section, taken along line 18—18 of FIGURE 12.

The main die section 118 of the upper die member 85 and the inner die section 88 of the lower die member 86 now completely close over the web portion of the extrudate and their die faces 98 and 128 cause the extrudate to be simultaneously deformed and pierced, as shown in FIGURE 17. As shown, areas of the web portion are offset into planes above and below the original plane, the offset areas being contiguous with the original plane but separated from each other, the web portion of the panel thus taking the same form as the panel shown in FIGURE 7.

The solenoids 142 are now actuated and cause the dies 139 to be drawn down toward the extrudate with the result that the shearing arms 140 and knives 141 shear off the unwanted sections of the side members and separate the extrudate into individual panels.

The die 84 during this closing cycle is moving towards the right of the apparatus in FIGURE 6. The die continues to move until the panel has cooled sufficiently to maintain its shape as described hereinbefore. After the necessary time has elapsed, the die opens and the die members 85 and 86 move apart. As the main die section 118 moves upwardly, the push rods 135 are also permitted to move upwardly with the result that the inner die section 88 moves down away from the formed panel, leaving the panel held by the supporting rods 134 and the die sections 104 and 110. The lower die member 86 has now moved downwardly, to permit the insertion of a vacuum ejector of conventional type into engagement with the upper surface of the formed panel. The solenoids 109 and 115 are now deactivated.

The die members 85 and 86 now begin their return travel to the backup and sizing die 21. The formed panel sections are held against movement by the vacuum ejector and thus as the lower die member 86 moves along its horizontal path, the inserts 105 and 111 slide in the side members until they reach the area where the side members were removed by the shearing arms 140. Upon reaching this area, the inserts 105 and 111 are free from the side members and the armatures 108 and 114 can be retracted into the solenoids. The die members are now ready for another cycle. The vacuum ejector can now retract and deposit the finished panels on a conveyor or other material transporting device.

From the foregoing description it can be seen that a process and apparatus have been provided for forming diverse plastic objects. The process is a continuous one and thus produces the objects at a greater rate and a lesser cost than has heretofore been possible. By using an extruded stream of plastic which has already been partially formed, the dies that perform the finishing operation need close on the plastic material for only a short time, thus increasing their production capacity. Although only certain manufacturing operations such as deforming or offsetting and cutting have been described, it is to be understood that similar operations can be performed on the extruded material by altering the nature of the dies. The term "die-forming" as used in the specification and in the following claims is therefore intended to include all operations that can be performed between two relatively movable die pieces.

The invention may be embodied in other specific forms not departing from the spirit or central characteristics thereof.

What is claimed is:

1. A process of forming plastic objects, comprising: continuously extruding a plastic extrudate having cylindrical side members and a web portion connecting said side members; grasping the side members of successive connected sections of said extrudate; simultaneously cutting and offsetting the web portions between said side members while said side members are being grasped and retained in their cylindrical configuration; severing the web portion of each section from the remaining web portions while retaining said side members intact; passing said sections through a cooling zone while supporting said side members; and completely severing said side members to separate said sections from the remainder of said extrudate.

2. A process of forming plastic objects having a pattern having predominantly longitudinal features and predominantly lateral features comprising: continuously extruding a plastic extrudate having said longitudinal features formed at the edges thereof in the direction of extrusion; grasping said edges of successive connected sections of said extrudate having said longitudinal features formed therein while retaining said longitudinal features; die-forming a portion of each section intermediate the edges thereof with said lateral features while said edges are being grasped and said longitudinal features retained; severing each die-formed portion from the next successive die-formed portion; and subsequently severing said edges between successive sections to separate said sections from the remainder of said extrudate.

3. A process of forming plastic objects having tubular side member and a patterned web portion connecting said side members comprising: continuously extruding a plastic extrudate having said tubular side members formed therein and a web joining said side members; engaging said web with cooperating die members to form said patterned web portion while retaining said side members in their formed configuration; severing each pattern web portion from the next successive web portion; and subsequently severing said side members between successive web portions to separate individual formed objects from said extrudate.

References Cited
UNITED STATES PATENTS

| | | | |
|---|---|---|---|
| 2,790,994 | 5/1957 | Cardot et al. | |
| 2,967,328 | 1/1961 | Shelby | 18—4 |
| 1,172,419 | 10/1958 | Carrier | 18—5 |
| 2,559,365 | 7/1951 | Middleton et al. | 264—285 X |
| 2,952,037 | 9/1960 | Ruck et al. | 264—210 X |
| 3,211,816 | 10/1965 | Brown | 264—210 X |

ROBERT F. WHITE, *Primary Examiner.*

S. I. LANDSMAN, *Assistant Examiner.*

U.S. Cl. X.R.

18—4, 19; 264—163, 177, 210, 285, 296